(12) United States Patent
Chiong et al.

(10) Patent No.: US 12,434,412 B2
(45) Date of Patent: Oct. 7, 2025

(54) PROCESS FOR PRODUCING FUNCTIONALIZED POROUS COMPOSITES

(71) Applicant: Celanese International Corporation, Irving, TX (US)

(72) Inventors: Hendrich Chiong, Florence, KY (US); Joseph Brian Scott, Florence, KY (US); Victoria Black, Florence, KY (US)

(73) Assignee: Celanese International Corporation, Irving, TX (US)

( * ) Notice: Subject to any disclaimer, the term of this patent is extended or adjusted under 35 U.S.C. 154(b) by 158 days.

(21) Appl. No.: 18/500,459

(22) Filed: Nov. 2, 2023

(65) Prior Publication Data

US 2024/0150538 A1 May 9, 2024

Related U.S. Application Data

(60) Provisional application No. 63/422,021, filed on Nov. 3, 2022.

(51) Int. Cl.
*B29C 43/00* (2006.01)
*B29C 67/04* (2017.01)
*C08J 9/24* (2006.01)
*C08J 9/26* (2006.01)
*C08J 9/28* (2006.01)
*C08J 9/36* (2006.01)

(52) U.S. Cl.
CPC ............ *B29C 43/006* (2013.01); *B29C 67/04* (2013.01); *C08J 9/24* (2013.01); *C08J 9/26* (2013.01); *C08J 9/28* (2013.01); *C08J 9/36* (2013.01); *C08J 2323/06* (2013.01)

(58) Field of Classification Search
CPC .......... B29C 43/006; B29C 67/04; C08J 9/24; C08J 9/26; C08J 9/28; C08J 9/36; C08J 2323/06; C08L 23/06
See application file for complete search history.

(56) References Cited

U.S. PATENT DOCUMENTS

| 4,828,699 | A | 5/1989 | Soehngen |
| 4,925,880 | A * | 5/1990 | Stein ........................ C08J 9/24 264/126 |
| 6,471,993 | B1 | 10/2002 | Shastri et al. |
| 6,657,078 | B2 | 12/2003 | Scates et al. |
| 7,902,398 | B2 | 3/2011 | Scates et al. |

(Continued)

OTHER PUBLICATIONS

PCT Search Report Corresponding to Application No. PCT/US2023/036687 on Feb. 15, 2024.

(Continued)

*Primary Examiner* — Jerzi H Moreno Hernandez
(74) *Attorney, Agent, or Firm* — Dority & Manning, P.A.

(57) ABSTRACT

Polymer composite materials are disclosed containing one or more chemical scavengers. The polymer composites are porous and are configured to be contacted with a liquid for removing trace amounts of metals, proteins, polypeptides, polyphenols, other organic compounds, and the like. In order to produce the porous composite polymer product, one or more chemical scavengers are combined with high density polyethylene particles and sintered into a shape. The polyethylene resin acts as a binder trapping or encasing the one or more chemical scavengers in the porous structure.

20 Claims, 5 Drawing Sheets

(56) References Cited

U.S. PATENT DOCUMENTS

| | | |
|---|---|---|
| 9,215,891 B2 | 12/2015 | Nazir et al. |
| 2005/0147580 A1 | 7/2005 | Connor et al. |
| 2007/0027370 A1 | 2/2007 | Brauker et al. |
| 2012/0301528 A1 | 11/2012 | Uhlmann et al. |
| 2013/0323383 A1 | 12/2013 | Nazir et al. |

OTHER PUBLICATIONS

Porvair, Stabifil™: Convenient, Robust and Economic Stabilisation of Beverages, pp. 262-263.

* cited by examiner

PROCESS FOR PRODUCING FUNCTIONALIZED POROUS COMPOSITES

RELATED APPLICATIONS

The present application is based upon and claims priority to U.S. Provisional Application Ser. No. 63/422,021, having a filing date of Nov. 3, 2022, which is incorporated herein by reference.

BACKGROUND

In many industrial and commercial processes, small amounts of contaminants can be present and/or accumulate in various liquid streams. Depending upon the process, removal of these contaminants may be desirable in order to increase the purity of the product being produced. In many instances, the contaminants may also represent valuable resources, such as precious metals. In these instances, value can be lost if the contaminants are not removed, reclaimed, and reused.

The need to remove contaminants from liquid streams can occur in various types of different industries and processes. For instance, heavy metals and precious metals are typically present in many water treatment streams. Other industries where contaminant removal is needed are the food and beverage industry, the pharmaceutical field, the oil and gas industry, and all different types of chemical manufacturing processes, in the pulp and paper industry, and in various other processes. For instance, any process that employs a catalyst typically produces small amounts of impurities generated by the catalyst materials and supports.

In the past, many chemical scavengers, such as metal scavengers, used in the past are employed in the form of relatively small particles. In some applications, the small particles are added to a cartridge in order to form a fixed bed for filtering fluids therethrough. Although the scavengers can be very effective at removing contaminants, the manner in which they are employed has created various drawbacks and problems. The fixed bed cartridges, for instance, can create relatively large pressure drops requiring significant amounts of energy in order to filter the liquids. The small particle sizes are also difficult to handle and process. Further, many of the cartridges have flow limitations that are not capable of accommodating the flow rates found in many industrial processes.

In addition to scavengers in the form of small particles, others have proposed capturing the scavengers in shaped articles. For instance, U.S. Pat. No. 9,215,891, which is incorporated herein by reference, describes forming composite materials containing a polyvinyl polypyrrolidone in the shape of a frit, a sheet, a tube, a disk, or a roll. These shaped articles in the form of rigid unitary bodies, however, are not amenable to all different types of processes and may lack sufficient surface area for some processes.

In view of the above, a need currently exists for a versatile polymer composite containing a chemical scavenger that can be formed into all different sizes and shapes. A need also exists for a polymer composite that has improved pore characteristics and/or improved scavenger availability for facilitating removal of contaminants from liquid streams.

SUMMARY

In general, the present disclosure is directed to a porous polymer composite material containing a chemical scavenger. The polymer composite material is formed by combining high molecular weight polyethylene particles with at least one chemical scavenger and then sintering the mixture into a desired shape. The high molecular weight polyethylene polymer acts as a binder in producing a porous composite. The high molecular weight polyethylene polymer offers various advantages in that the polymer is non-reactive, can withstand high temperatures, and is chemically neutral.

The porous polymer composite material of the present disclosure can offer various advantages and benefits. For instance, the process of producing the composite material is versatile and can be used to produce any suitable shape. Further, the chemical scavenger is encased or otherwise trapped in the composite material eliminating the handling of small particles and leading to an overall reduction in dust generation.

In one embodiment, for instance, the present disclosure is directed to a polymer composite comprising a porous substrate. The porous substrate comprises a binder that includes at least one type of high density polyethylene particles. The high density polyethylene particles are sintered together to form a porous structure. The high density polyethylene polymer has a molecular weight of from about 1,000,000 g/mol to about 12,000,000 g/mol. The high density polyethylene particles have an average size (D50) of from about 5 microns to about 500 microns. The polymer composite further includes at least one chemical scavenger contained within the porous structure such that the chemical scavenger is exposed to fluids that come into contact with the porous substrate.

In accordance with the present disclosure, the porous substrate can have a porosity of greater than about 10%, such as greater than about 20%, such as greater than about 30%, such as greater than about 40%, such as greater than about 50%, such as greater than about 60% and less than about 85%. The porous substrate can also display an average pore size of greater than about 4 nm, such as greater than about 4.2 nm, such as greater than about 4.4 nm, such as greater than about 4.6 nm, such as greater than about 4.8 nm, such as greater than about 5 nm, such as greater than about 5.2 nm, such as greater than about 5.4 nm, such as greater than about 5.6 nm, and less than about 30 nm, such as less than about 20 nm, such as less than about 15 nm, such as less than about 10 nm, such as less than about 8 nm.

The polymer composites can also display a BET surface area of greater than about 0.03 $m^2/g$, such as greater than about 0.05 $m^2/g$, such as greater than about 0.07 $m^2/g$, such as greater than about 0.09 $m^2/g$, such as greater than about 0.11 $m^2/g$, such as greater than about 0.13 $m^2/g$, such as greater than about 0.15 $m^2/g$, such as greater than about 0.17 $m^2/g$, such as greater than about 0.19 $m^2/g$, such as greater than about 0.21 $m^2/g$, such as greater than about 0.23 $m^2/g$, such as greater than about 0.25 $m^2/g$, such as greater than about 0.27 $m^2/g$, such as greater than about 0.29 $m^2/g$, such as greater than about 0.31 $m^2/g$, such as greater than about 0.33 $m^2/g$, such as greater than about 0.35 $m^2/g$, such as greater than about 0.37 $m^2/g$, and less than about 0.7 $m^2/g$.

In one aspect, the high density polyethylene polymer particles selected for use in the present disclosure is carefully controlled to optimize availability of the chemical scavenger, the ability to maximize loading of the chemical scavenger into the porous structure, or in order to improve one or more other properties. In one aspect, the high density polyethylene polymer particles can have a bulk density of less than about 0.034 g/cc, such as less than about 0.3 g/cc prior to sintering. The high density polyethylene particles, in one embodiment, can have an average particle size of less than about 50 microns. The polyethylene particles can have a non-spherical shape. For instance, the high density polyethylene polymer particles can have a multi-lobal shape, such as in the shape of popcorn kernels.

In one aspect, the polymer composite contains two different types of high density polyethylene particles. For instance, the second high density polyethylene particles can have an average particle size that is greater than the average particle size of the first high density polyethylene particles. In one embodiment, the average particle size of the first high density polyethylene particles is from about 5 microns to about 100 microns and the average particle size of the second high density polyethylene particles can be from about 80 microns to about 200 microns. The two different polyethylene polymer particles can produce a porous structure having a bimodal pore size distribution.

All different types of chemical scavengers can be incorporated into the polymer composite. In one aspect, the chemical scavenger comprises a polyvinyl lactam, such as polyvinyl polypyrrolidone.

In one embodiment, the chemical scavenger comprises a scavenger component immobilized on a solid carrier that is then incorporated into the polymer composite. The solid carrier, for instance, can comprise porous particles. In various embodiments, the solid carrier can comprise silica particles, alumina particles, zeolite particles, clay particles, silicate particles, or mixtures thereof.

For exemplary purposes only, the scavenger component contained on the solid carrier can comprise a polyvinyl polypyrrolidone, an aminoalkyl compound, a mercaptoalkyl compound, a thiourea, an alkyl thiourea, an imino diacetate, an aminomethyl phosphonic acid, a benzyl amine, an imidazole, an amine, a thiol, an imidazolylpropyl amino, a mercaptophenyl amino, an aminoethyl amino, a polybenzimidazole, or mixtures thereof.

The present disclosure is also directed to a process for forming a porous composite article. The process includes forming a molding powder into a desired shape. The molding powder comprises thermoplastic polymer particles combined with a chemical scavenger. The molding powder in a desired shape is heated to a temperature of from 140° C. to 360° C. for a period of time sufficient to permit the thermoplastic polymer to soften, without melting, while producing a porous structure having a porosity of at least about 30%. The shape is maintained under pressure. The chemical scavenger is contained within the resulting porous structure. The porous composite article is then cooled. The porous article can have any suitable shape. In one embodiment, the porous composite article has a three-dimensional, non-planar shape.

During the process, the molding powder can be heated to a temperature of from about 150° C. to about 280° C. or, in another aspect, from about 260° C. to about 320° C. In one embodiment, the molding powder can be combined with a liquid to form a slurry and then formed into the desired shape. Alternatively, the molding powder can be formed into the desired shape in a dry state. When using a slurry, at least a portion of the liquid is separated from the molding powder through filtration or evaporation prior to forming the desired shape.

In one embodiment, a leachable agent can be included in the molding powder and removed from the resulting porous composite article by contacting the porous composite article with a liquid that dissolves the leachable component in order to increase the porosity of the porous composite article. The leachable agent, for instance, can comprise a water-soluble component. For example, the leachable agent can comprise a water-soluble metal salt, such as sodium chloride. Alternatively, the leachable agent can comprise a water-insoluble compound that is dissolvable in other solvents.

The polymer composite of the present disclosure can have any suitable shape. In one embodiment, the polymer composite has a non-planar and non-tubular shape. The polymer composite can be net shape molded or can be molded into a form and then ground into a desired particle size range.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
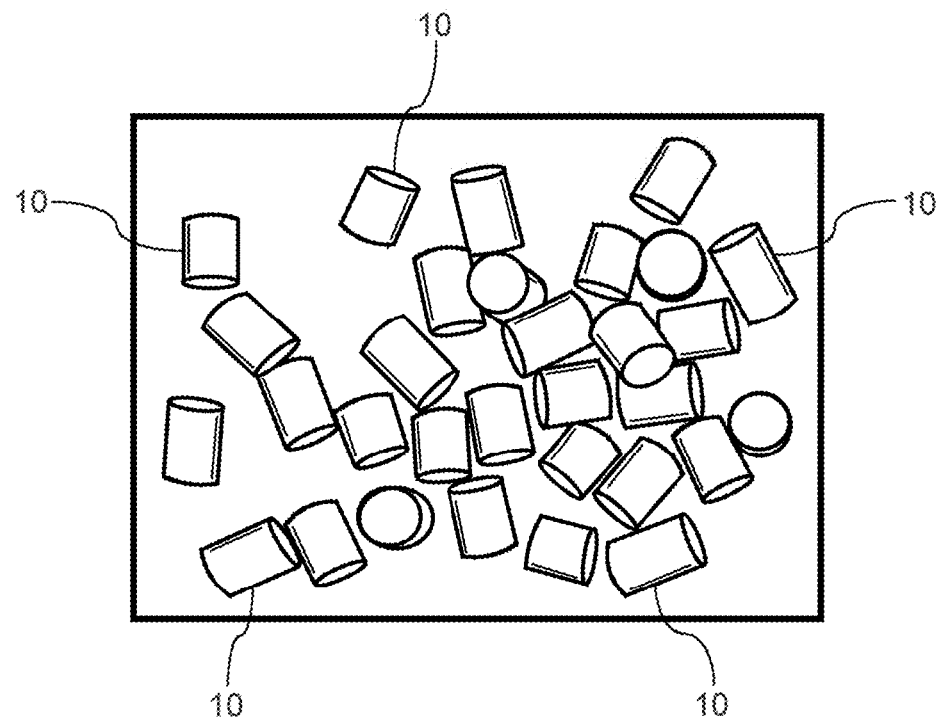
FIG. 1 is a plan view of one exemplary embodiment of a porous polymer composite product made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only and is not intended as limiting the broader aspects of the present disclosure.

In general, the present disclosure is directed to a polymer composite material containing at least one chemical scavenger. The polymer composite is formed from high density polyethylene particles that serve as a binder, a carrier and a delivery device for the one or more chemical scavengers. In the past, for instance, chemical scavengers were typically used alone in very small particle sizes. Thus, the chemical scavengers were very difficult to handle and to efficiently contact with liquid streams for removing contaminants. Through the process and system of the present disclosure, however, chemical scavengers can be incorporated into porous substrates having any desired size and shape for facilitating delivery of the one or more scavengers into contact with a fluid for removing contaminants.

The porous polymer composites of the present disclosure offer numerous advantages and benefits. For instance, the polymer composites of the present disclosure offer versatility not available in the past. The ability to incorporate chemical scavengers into a porous structure, for instance, eliminates process drawbacks and limitations experienced when handling small particle sizes. The polymer composites of the present disclosure thus simplify large scale utilization of chemical scavengers. Encasing the one or more chemical scavengers into the porous polymer structure also reduces dust generation and dramatically facilitates handling of the chemical scavengers. Thus, the polymer composites are not only more efficient to use but promote worker safety. In addition, the porous polymer structures of the present disclosure also eliminate the need for "polishing" of fine particles of scavengers.

The porous polymer composites of the present disclosure are generally formed by combining one or more chemical scavengers with high density polyethylene particles and, through a sintering process, forming a porous structure. During sintering, the polyethylene particles are compacted and formed into a solid mass without melting the polymer using heat and/or pressure. Sintering high density polyethylene particles in accordance with the present disclosure produces porous structures having fluid capillaries that allow fluids to contact the chemical scavengers contained in the structure when placed in a fluid. In accordance with the present disclosure, selection of the particular high density polyethylene particles facilitates control of the amount of chemical scavenger that can be incorporated into the structure and influences the porous nature of the structure. These variables can be controlled in order to optimize use of the polymer composite in a particular application.

The high density polyethylene particles incorporated into the polymer composite of the present disclosure generally have a density of about 0.92 g/cm$^3$ or greater, such as about 0.93 g/cm$^3$ or greater, such as about 0.94 g/cm$^3$ or greater, and generally less than about 1 g/cm$^3$, such as less than about 0.97 g/cm$^3$.

The high density polyethylene polymer can be made from over 90% ethylene derived units, such as greater than 95% ethylene derived units, or from 100% ethylene derived units. The polyethylene can be a homopolymer or a copolymer, including a terpolymer, having other monomeric units.

The high density polyethylene can be a high molecular weight polyethylene, a very high molecular weight polyethylene, and/or an ultrahigh molecular weight polyethylene. "High molecular weight polyethylene" refers to polyethylene compositions with an average molecular weight of at least about 3×10$^5$ g/mol and, as used herein, is intended to include very-high molecular weight polyethylene and ultrahigh molecular weight polyethylene. For purposes of the present specification, the molecular weights referenced herein are determined in accordance with the Margolies equation ("Margolies molecular weight").

"Very-high molecular weight polyethylene" refers to polyethylene compositions with a weight average molecular weight of less than about 3×10$^6$ g/mol and more than about 1×10$^6$ g/mol. In some embodiments, the molecular weight of the very-high molecular weight polyethylene composition is between about 2×10$^6$ g/mol and less than about 3×10$^6$ g/mol.

"Ultra-high molecular weight polyethylene" refers to polyethylene compositions with an average molecular weight of at least about 3×10$^6$ g/mol. In some embodiments, the molecular weight of the ultra-high molecular weight polyethylene composition is between about 3×10$^6$ g/mol and about 30×10$^6$ g/mol, or between about 3×10$^6$ g/mol and about 20×10$^6$ g/mol, or between about 3×10$^6$ g/mol and about 10×10$^6$ g/mol, or between about 3×10$^6$ g/mol and about 6×10$^6$ g/mol.

In one aspect, the high density polyethylene is a homopolymer of ethylene. In another embodiment, the high density polyethylene may be a copolymer. For instance, the high density polyethylene may be a copolymer of ethylene and another olefin containing from 3 to 16 carbon atoms, such as from 3 to 10 carbon atoms, such as from 3 to 8 carbon atoms. These other olefins include, but are not limited to, propylene, 1-butene, 1-pentene, 1-hexene, 1-heptene, 1-octene, 4-methylpent-1-ene, 1-decene, 1-dodecene, 1-hexadecene and the like. Also utilizable herein are polyene comonomers such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene. However, when present, the amount of the non-ethylene monomer(s) in the copolymer may be less than about 10 mol. %, such as less than about 5 mol. %, such as less than about 2.5 mol. %, such as less than about 1 mol. %, wherein the mol. % is based on the total moles of monomer in the polymer.

In one embodiment, the high density polyethylene may have a monomodal molecular weight distribution. Alternatively, the high density polyethylene may exhibit a bimodal molecular weight distribution. For instance, a bimodal distribution generally refers to a polymer having a distinct higher molecular weight and a distinct lower molecular weight (e.g. two distinct peaks) on a size exclusion chromatography or gel permeation chromatography curve. In another embodiment, the high density polyethylene may exhibit more than two molecular weight distribution peaks such that the polyethylene exhibits a multimodal (e.g., trimodal, tetramodal, etc.) distribution. Alternatively, the high density polyethylene may exhibit a broad molecular weight distribution wherein the polyethylene is comprised of a blend of higher and lower molecular weight components such that the size exclusion chromatography or gel permeation chromatography curve does not exhibit at least two distinct peaks but instead exhibits one distinct peak broader than the individual component peaks.

The one or more polyethylene polymers incorporated into the polymer composite of the present disclosure generally have a relatively high molecular weight and can be considered at least a high molecular weight polyethylene, but can also comprise a very high molecular weight polyethylene or an ultrahigh molecular weight polyethylene. The molecular weight of the one or more polymers incorporated into the polymer composite, for instance, can generally be greater than about 500,000 g/mol, such as greater than about 700,000 g/mol, such as greater than about 1,000,000 g/mol, such as greater than about 1,250,000 g/mol, such as greater than about 1,500,000 g/mol, such as greater than about 1,750,000 g/mol, such as greater than about 2,000,000 g/mol, such as greater than about 2,250,000 g/mol, such as greater than about 2,500,000 g/mol, such as greater than about 2,750,000 g/mol, such as greater than about 3,000,000 g/mol, such as greater than about 3,250,000 g/mol, such as greater than about 3,500,000 g/mol, such as greater than about 3,750,000 g/mol, such as greater than about 4,000,000 g/mol, such as greater than about 4,250,000 g/mol, such as greater than about 4,500,000 g/mol, such as greater than about 4,750,000 g/mol, such as greater than about 5,000,000 g/mol, such as greater than about 5,250,000 g/mol, such as greater than about 5,500,000 g/mol, such as greater than about 5,750,000 g/mol, such as greater than about 6,000,000 g/mol, such as greater than about 6,250,000 g/mol, such as greater than about 6,500,000 g/mol, such as greater than about 6,750,000 g/mol, such as greater than about 7,000,000 g/mol, such as greater than about 7,250,000 g/mol, such as greater than about 7,500,000 g/mol, such as greater than about 7,750,000 g/mol, such as greater than about 8,000,000 g/mol. The molecular weight of the one or more polyethylene polymers is generally less than about 12,000,000 g/mol, such as less than about 10,000,000 g/mol, such as less than about 8,000,000 g/mol, such as less than about 6,000,000 g/mol, such as less than about 5,000,000 g/mol.

The particle size of each high density polyethylene polymer incorporated into the polymer composition can influence many factors including the porous nature of the resulting product, the pore size of the resulting product, the amount of chemical scavenger incorporated into the polymer composite, and various other properties and characteristics. In general, the average particle size (D50) (measured using laser scattering) is less than about 500 microns, such as less than about 400 microns, such as less than about 300 microns, such as less than about 200 microns, such as less than about 100 microns. The average particle size is generally greater than about 1 micron, such as greater than about 10 microns, such as greater than about 20 microns.

In one aspect, it was discovered that using relatively smaller particle sizes offered unexpectedly better properties. Thus, in one embodiment, at least one of the high density polyethylene polymers incorporated into the polymer composition has an average particle size of less than about 100 microns, such as less than about 90 microns, such as less than about 80 microns, such as less than about 70 microns, such as less than about 60 microns, such as less than about 50 microns, such as less than about 40 microns, such as less than about 35 microns, and generally greater than about 10 microns, such as greater than about 20 microns, such as greater than about 25 microns.

In addition to particle size, the particle morphology of the high density polyethylene particles can also be controlled or selected for producing optimum results. For instance, in one aspect, the polyethylene polymer particles incorporated into the polymer composite are exreactor grade meaning that the particles have not been ground or otherwise changed from the particle morphology that exits the polymer producing reactor. By selecting a particular catalyst and the reaction conditions, the particle morphology can be changed and controlled. In one aspect, for instance, high density polyethylene particles can be selected that do not have a spherical shape. The particles, for instance, can have a multi-lobal shape. For instance, the particles can have a "popcorn-like" shape. Using multi-lobal particles can improve the porosity characteristics, can facilitate sintering in certain applications, and can be selected in order to maximize the amount of chemical scavenger incorporated into the product.

The bulk density of the one or more high density polyethylene particles can also influence the final characteristics and properties of the polymer composite. In one aspect, it was determined that lower bulk densities may be preferred for some applications. For instance, the bulk density of the polyethylene particles can be less than about 0.34 g/cc, such as less than about 0.32 g/cc, such as less than about 0.3 g/cc, and generally greater than about 0.2 g/cc, such as greater than about 0.24 g/cc, such as greater than about 0.26 g/cc. In other embodiments, however, higher bulk densities may be used. For instance, the bulk density can be greater than about 0.34 g/cc, such as greater than about 0.36 g/cc, such as greater than about 0.38 g/cc, and generally less than about 0.5 g/cc, such as less than about 0.4 g/cc. Bulk density can be measured according to ISO Test 60 or DIN Test 53466.

In one embodiment, the polymer composite of the present disclosure is formed from two or more different high density polyethylene polymers. For example, in one embodiment, high density polyethylene polymers having different particle sizes can be used in order to control and influence the porosity of the polymer composite and/or the pore size. For example, in one embodiment, the polymer composite can be formed from a first high density polyethylene polymer having a first average particle size and a second high density polyethylene polymer having a second average particle size.

The first average particle size, for instance, can be smaller than the second average particle size. For instance, the first average particle size can be less than about 200 microns, such as less than about 150 microns, such as less than about 100 microns, such as less than about 70 microns, such as less than about 50 microns, such as less than about 40 microns, and generally greater than about 10 microns, such as greater than about 20 microns. The average particle size of the second high density polyethylene polymer, on the other hand, is larger than the average particle size of the first high density polyethylene polymer and can be greater than about 70 microns, such as greater than about 80 microns, such as greater than about 90 microns, such as greater than about 100 microns, such as greater than about 110 microns, and generally less than about 500 microns, such as less than about 400 microns, such as less than about 300 microns, such as less than about 200 microns, such as less than about 170 microns, such as less than about 150 microns. The two different high density polyethylene polymers, when combined together, form a bimodal size distribution. When sintered, the resulting polymer composite can have a bimodal pore size that may offer various advantages and benefits depending upon the type of chemical scavenger incorporated into the composite and the fluids into which the polymer composite is contacted.

In other embodiments, the first high density polyethylene polymer can have a lower bulk density than the second high density polyethylene polymer. In addition, the molecular weight of each polyethylene polymer can be different. For instance, the first high density polyethylene polymer can have a molecular weight that is less than about 10%, such as less than about 20%, such as less than about 30%, such as less than about 40%, such as less than about 50%, such as less than about 60%, such as less than about 70% of the molecular weight of the second high density polyethylene polymer, or vice versus.

The relative amount between the first high density polyethylene polymer and the second high density polyethylene polymer contained in the polymer composite can depend on numerous factors. For example, the weight ratio between the first high density polyethylene polymer and the second high density polyethylene polymer can be from about 10:1 to about 1:10. In one embodiment, the first high density polyethylene polymer can be present in an amount greater than the second high density polyethylene polymer. For instance, the first high density polyethylene polymer can be present in an amount greater than about 50%, such as in an amount greater than about 60%, such as in an amount greater than about 70%, and generally in an amount less than about 90%, such as in an amount less than about 80%, such as in an amount less than about 70% based upon the total weight of all polyethylene polymers present in the polymer composite.

Any method known in the art can be utilized to synthesize the polyethylene polymers. The polyethylene powder is typically produced by the catalytic polymerization of ethylene monomer or optionally with one or more other 1-olefin co-monomers, the 1-olefin content in the final polymer being less or equal to 10% of the ethylene content, with a heterogeneous catalyst and an organo aluminum or magnesium compound as cocatalyst. The ethylene is usually polymerized in gaseous phase or slurry phase at relatively low temperatures and pressures. The polymerization reaction may be carried out at a temperature of between 50° C. and 100° C. and pressures in the range of 0.02 and 2 MPa.

The molecular weight of the polyethylene can be adjusted by adding hydrogen. Altering the temperature and/or the type and concentration of the co-catalyst may also be used to fine tune the molecular weight. Additionally, the reaction may occur in the presence of antistatic agents to avoid wall fouling and product contamination.

Suitable catalyst systems include but are not limited to Ziegler-Natta type catalysts and/or metallocene catalysts. Typically Ziegler-Natta type catalysts are derived by a combination of transition metal compounds of Groups 4 to 8 of the Periodic Table and alkyl or hydride derivatives of metals from Groups 1 to 3 of the Periodic Table. Transition metal derivatives used usually comprise the metal halides or esters or combinations thereof. Exemplary Ziegler-Natta catalysts include those based on the reaction products of organo aluminum or magnesium compounds, such as for example but not limited to aluminum or magnesium alkyls and titanium, vanadium or chromium halides or esters. The heterogeneous catalyst might be either unsupported or supported on porous fine grained materials, such as silica or magnesium chloride. Such support can be added during synthesis of the catalyst or may be obtained as a chemical reaction product of the catalyst synthesis itself.

In one embodiment, a suitable catalyst system could be obtained by the reaction of a titanium(IV) compound with a trialkyl aluminum compound in an inert organic solvent at temperatures in the range of −40° C. to 100° C., preferably −20° C. to 50° C. The concentrations of the starting materials are in the range of 0.1 to 9 mol/L, preferably 0.2 to 5 mol/L, for the titanium(IV) compound and in the range of 0.01 to 1 mol/L, preferably 0.02 to 0.2 mol/L for the trialkyl aluminum compound. The titanium component is added to the aluminum component over a period of 0.1 min to 60 min, preferably 1 min to 30 min, the molar ratio of titanium and aluminum in the final mixture being in the range of 1:0.01 to 1:4.

In another embodiment, a suitable catalyst system is obtained by a one or two-step reaction of a titanium(IV) compound with a trialkyl aluminum compound in an inert organic solvent at temperatures in the range of −40° C. to 200° C., preferably −20° C. to 150° C. In the first step, the titanium(IV) compound is reacted with the trialkyl aluminum compound at temperatures in the range of −40° C. to 100° C., preferably −20° C. to 50° C. using a molar ratio of titanium to aluminum in the range of 1:0.1 to 1:0.8. The concentrations of the starting materials are in the range of 0.1 to 9.1 mol/L, preferably 5 to 9.1 mol/L, for the titanium (IV) compound and in the range of 0.05 and 1 mol/L, preferably 0.1 to 0.9 mol/L for the trialkyl aluminum compound. The titanium component is added to the aluminum compound over a period of 0.1 min to 800 min, preferably 30 min to 600 min. In a second step, if applied, the reaction product obtained in the first step is treated with a trialkyl aluminum compound at temperatures in the range of −10° C. to 150° C., preferably 10° C. to 130° C. using a molar ratio of titanium to aluminum in the range of 1:0.01 to 1:5.

In yet another embodiment, a suitable catalyst system is obtained by a procedure wherein, in a first reaction stage, a magnesium alcoholate is reacted with a titanium chloride in an inert hydrocarbon at a temperature of 50° to 100° C. In a second reaction stage, the reaction mixture formed is subjected to heat treatment for a period of about 10 to 100 hours at a temperature of 110° to 200° C. accompanied by evolution of alkyl chloride until no further alkyl chloride is evolved, and the solid is then freed from soluble reaction products by washing several times with a hydrocarbon.

In a further embodiment, catalysts supported on silica, such as for example the commercially available catalyst system Sylopol 5917 can also be used.

In one embodiment, especially when producing a relatively high molecular weight polyethylene, a metallocene-type catalyst may be used. For example, in one embodiment, two different metallocene-type catalysts can be used to produce the polyethylene polymer. For instance, the metallocene catalysts may be made from metals, such as hafnium and/or chromium.

Using such catalyst systems, the polymerization is normally carried out in suspension at low pressure and temperature in one or multiple steps, continuous or batch. The polymerization temperature is typically in the range of 30° C. to 130° C., preferably in the range of 50° C. and 90° C. and the ethylene partial pressure is typically less than 10 MPa, preferably 0.05 and 5 MPa. Trialkyl aluminums, like for example but not limited to isoprenyl aluminum and triisobutyl aluminum, are used as co-catalyst such that the ratio of Al:Ti (co-catalyst versus catalyst) is in the range of 0.01 to 100:1, more preferably in the range of 0.03 to 50:1. The solvent is an inert organic solvent as typically used for Ziegler type polymerizations. Examples are butane, pentane, hexane, cyclohexene, octane, nonane, decane, their isomers and mixtures thereof. The polymer molecular mass is controlled through feeding hydrogen. The ratio of hydrogen partial pressure to ethylene partial pressure is in the range of 0 to 50, preferably the range of 0 to 10. The polymer is isolated and dried in a fluidized bed dryer under nitrogen. The solvent may be removed through steam distillation in case of using high boiling solvents. Salts of long chain fatty acids may be added as a stabilizer. Typical examples are calcium-magnesium and zinc stearate.

Generally a cocatalyst such as alumoxane or alkyl aluminum or alkyl magnesium compound is also employed. Other suitable catalyst systems include Group 4 metal complexes of phenolate ether ligands.

Generally, one or more high density polyethylene polymers are present in the polymer composite of the present disclosure in an amount greater than about 20% by weight, such as in an amount greater than about 30% by weight, such as in an amount greater than about 40% by weight, and generally in an amount less than about 98% by weight, such as in an amount less than about 90% by weight, such as in an amount less than about 80% by weight, such as in an amount less than about 70% by weight. The amount of one or more high density polyethylene polymers present in the polymer composite can depend upon the type of chemical scavenger incorporated into the structure and the amount of high density polyethylene polymer that is needed in order to produce the porous structure. In many applications, various benefits and advantages can be achieved if greater amounts of one or more chemical scavengers are incorporated into the polymer composite.

In order to produce the polymer composite of the present disclosure, one or more high density polymers in the form of particles are combined with one or more chemical scavengers. In general, any suitable chemical scavenger can be incorporated into the polymer composite as long as the scavenger is compatible with the high density polyethylene polymer. The chemical scavengers incorporated into the polymer composite can be scavengers for organic compounds, such as high molecular weight organic compounds, scavengers for polar molecules, scavengers for anions, scavengers for cations, and mixtures thereof. In one embodiment, the chemical scavenger can be a metal scavenger that binds to metal ions. Although any metal ions can be removed using the polymer composite of the present disclosure, particular metal ions that can be collected by the polymer composite include precious metals such as rhodium, palladium, platinum, gold, silver, or heavy metals including iron, copper, mercury, and the like.

Although not necessary, in one embodiment, the one or more chemical scavengers contained in the polymer composite have a relatively small average particle size. For example, the average particle size of the chemical scavenger can be less than about 300 microns, such as less than about 200 microns, such as less than about 100 microns, such as less than about 90 microns, such as less than about 80 microns, such as less than about 70 microns. Incorporating chemical scavengers with relatively small particle sizes into the polymer composite of the present disclosure greatly facilitates handling of the chemical scavenger and facilitates contact with fluid streams.

In one aspect, the chemical scavenger can be a vinyl lactam polymer, such as polyvinyl polypyrrolidone. The polyvinyl polypyrrolidone can be crosslinked in order to make the material less soluble in various liquids.

The vinyl lactam polymer can be a homopolymer or a copolymer. In addition to polyvinyl polypyrrolidone, the chemical scavenger can also be polyvinyl caprolactam. In still another embodiment, the chemical scavenger is a copolymer of vinyl pyrrolidone and vinyl imidazole.

The polyvinyl polypyrrolidone can be incorporated into the polymer composite alone or in combination with a solid carrier. The solid carrier, for instance, can be any suitable particle capable of immobilizing the chemical scavenger. For example, in one embodiment, the polyvinyl polypyrrolidone can be immobilized onto a silica carrier. For instance, the vinyl lactam polymer, such as polyvinyl polypyrrolidone, can be chemically bonded to the surface of the carrier. In one particular embodiment, polyvinyl polypyrrolidone is immobilized on a silica carrier, such as silica gel, and is present in the resulting structure in an amount of from about 2% to about 60% by weight, such as from about 4% to about 20% by weight.

Vinyl lactam polymers can be effective chemical scavengers for various chemical species. For instance, vinyl lactam polymers efficiently bind to polyphenols, enzymes, proteins, and the like. The above chemical species, for instance, are desirably removed from various beverages including beer. In other applications, the vinyl lactam polymer can be used to remove metal ions from solutions in all different types of applications. Metal ions that can be removed include lithium, sodium, potassium, rubidium and cesium; alkaline earth metals such as beryllium, magnesium, calcium, strontium and barium; transition metals such as zinc, molybdenum, cadmium, scandium, titanium, vanadium, chromium, manganese, iron, cobalt, nickel, copper, yttrium, zirconium, niobium, technetium, ruthenium, rhodium, palladium, silver, hafnium, tantalum, tungsten, rhenium, osmium, iridium, platinum and gold; lanthanoids such as lanthanum, cerium, praseodymium, neodymium, promethium, samarium, europium, gadolinium, terbium, dysprosium, holmium, erbium, thulium, ytterbium and lutetium; actinides such as thorium, uranium, neptunium and plutonium; and p-block metals such as aluminium, gallium, indium, tin, thallium, lead and bismuth. Polyvinyl polypyrrolidone, for instance, is particularly effective at removing rhodium from various industrial processes, especially processes that use catalysts containing rhodium.

In addition to vinyl lactam polymers, various other chemical scavengers can be incorporated into the polymer composite. Such chemical scavengers include polybenzimidazole, an aminoalkyl compound, a mercaptoalkyl compound, a thiourea, an alkyl thiourea, an imino diacetate, an aminomethyl phosphonic acid, a benzyl amine, an imidazole, an amine, a thiol, an imidazolylpropyl amino, a mercaptophenyl amino, an aminoethyl amino, a polybenzimidazole, or mixtures thereof. The above chemical scavengers can offer various advantages and benefits depending upon the particular application and the chemical species to be removed.

The above scavengers, unless in the form of solid particles, can be immobilized on a solid carrier for incorporation into the polymer composite of the present disclosure. The solid carrier can comprise, for instance, any suitable particle, such as a porous particle. Examples of solid carriers that can be used include silica particles, alumina particles, zeolite particles, clay particles, silicate particles, or mixtures thereof.

Although not so limited, the chemical scavengers described above are particularly well suited to removing various metal ions from fluids. For exemplary purposes only and without limitation, below is a non-exhaustive list of metals that may be removed using the various chemical scavengers.

| Functional Group | Metals |
| --- | --- |
| thiourea | Pd, Pt, Ru, Rh, Au, Ag, Cu, Hg, Pb, Cd, Ni, Co, Fe, V, Zn |
| imino diacetate | Cu, Al, Ga, In, V, Pb, Ni, Zn, Cd, Be, Mn, Sr, Ba, Co, Fe |
| aminomethyl phosphonic acid | Fe, Cu, Ni, Al, Co, V |
| benzyl amine | Rh, Pd, Cu, Co, Ni |
| imidazole | Rh, Co, Pd, Ni |
| amine | Pd in basic media and with phosphines, Co, Ni, Rh |
| Thiol | Pd in acidic media and with phosphines, Co, Fe, Ni, Rh |
| Imidazolylpropyl amino | Pd, Ru, Os, Co, Ni, V, Rh, Cu, Fe, Sn, V |
| Mercaptophenyl amino | Pd, Pt, Rh, Ni, Ru, Cu, Sn, Ag, Au, Cd, Hg, Pb |
| Aminoethyl amino | Pd, Rh, V, Cu, Fe, V |

In one embodiment, for instance, the chemical scavenger can be an aminoalkyl 3 silica (silica functionalized with aminoalkyl groups), which is also known as penta amine ethyl sulfide amide silica. The aminoalkyl 3 silica, for instance, can have a bulk density of from about 400 g/L to about 600 g/L and can have an average particle size of from about 200 microns to about 500 microns.

Another chemical scavenger that comprises a surface active modified silica is an aminoalkyl 1 silica, also known as 2-aminoethyl sulfide ethyl silica. Aminoalkyl 1 silica can have a bulk density of from about 400 g/L to about 600 g/L and can have an average particle size of from about 200 microns to about 500 microns.

Still another surface active modified silica that can be incorporated into the polymer composite of the present disclosure is mercaptoalkyl 1 silica (silica functionalized with mercaptoalkyl groups), which is also known as 3-mercaptopropyl ethyl sulfide silica. Mercaptoalkyl 1 silica can be in the form of a white powder having a bulk density of from about 400 g/L to about 600 g/L and having an average particle size of from about 200 microns to about 500 microns.

Another chemical scavenger that can be incorporated into the polymer composite is mercaptoalkyl 4 silica, which is also known as 2-mercaptoethyl ethyl sulfide silica. Mercaptoalkyl 4 silica also has a bulk density of from about 400 g/L to about 600 g/L and an average particle size, in one embodiment, of from about 200 microns to about 500 microns.

A silica functionalized with alkyl thiourea can also be incorporated into the polymer composite of the present disclosure as a chemical scavenger. Alkyl thiourea silica is also in the form of a surface active modified silica that can have a bulk density of from about 400 g/L to about 600 g/L and an average particle size of from about 200 microns to about 500 microns.

It should be understood that the above surface active modified silicas as described above can also be produced in other particle sizes and incorporated into the polymer composite. For instance, because the high density polyethylene polymer serves as an excellent carrier for the chemical scavenger, in one embodiment, the surface modified silicas can be reduced in particle size and incorporated into the polymer composite. For instance, the surface modified silicas can have an average particle size of less than about 250 microns, such as less than about 200 microns, such as less than about 150 microns, such as less than about 100 microns, and generally greater than about 50 microns. Reducing the particle size may create more surface area that may be desirable in some applications.

In addition to one or more high density polyethylene polymers and one or more chemical scavengers, the polymer composite of the present disclosure can optionally contain various other components and additives. For example, in one embodiment, a leaching agent can be combined with the high density polyethylene particles and the one or more chemical scavengers during formation of the porous structure (e.g. prior to sintering). The leaching agent can be added during production of the porous substrate and then later removed for increasing the porosity and/or otherwise altering or changing the pore size for optimum results. The leaching agent, for instance, can be solvent soluble. In this manner, the porous structure of the polymer composite can be formed and then contacted with a solvent for removing the leaching agent. In this manner, the porosity of the resulting polymer composite can be increased.

In general, any suitable leaching agent that does not adversely interfere with the one or more chemical scavengers can be incorporated into the product. In one aspect, the leaching agent can be a water soluble salt. The water soluble salt can be, for instance, an alkali or alkaline earth metal salt that can, for instance, be combined with a halide, such as chloride. One example of a water soluble leaching agent is sodium chloride.

In addition to water soluble leaching agents, it should be understood that various other solvent soluble compounds or polymers can be used. For instance, the leaching agent can be soluble in an organic liquid, such as an alcohol, acetone, or other solvent.

One or more leaching agents can be initially combined with the components used to produce the porous structure in various amounts depending upon the application. For instance, one or more leaching agents can be incorporated into the component mixture used to form the polymer composite in an amount generally greater than about 1% by weight, such as in an amount greater than about 3% by weight, such as in an amount greater than about 5% by weight, such as in an amount greater than about 8% by weight, such as in an amount greater than about 10% by weight, such as in an amount greater than about 12% by weight. One or more leaching agents can be present in the components generally in an amount less than about 40% by weight, such as in an amount less than about 35% by weight, such as in an amount less than about 30% by weight, such as in an amount less than about 25% by weight, such as in an amount less than about 20% by weight.

Various other components and additives can be incorporated into the polymer composite of the present disclosure. Such additives include acid scavengers, heat stabilizers, light stabilizers, UV absorbers, flame retardants, lubricants (mold release agent), mechanical reinforcement materials such as carbon fibers, density modifiers, and mixtures thereof.

In one embodiment, an acid scavenger can be incorporated into the polymer composite. The acid scavenger, for instance, may comprise an alkali metal salt or an alkaline earth metal salt. The salt can comprise a salt of a fatty acid, such as a stearate, or another organic acid, such as citric acid. Other acid scavengers include carbonates, oxides, or hydroxides. Particular acid scavengers that may be incorporated into the polymer composition include a metal stearate, such as calcium stearate, or tricalcium citrate. Still other acid scavengers include zinc oxide, calcium carbonate, magnesium oxide, and mixtures thereof.

In one embodiment, a heat stabilizer may be present in the composition. The heat stabilizer may include, but is not limited to, phosphites, aminic antioxidants, phenolic antioxidants, or any combination thereof.

In one embodiment, an antioxidant may be present in the composition. The antioxidant may include, but is not limited to, secondary aromatic amines, benzofuranones, sterically hindered phenols, or any combination thereof.

In one embodiment, a light stabilizer may be present in the composition. The light stabilizer may include, but is not limited to, 2-(2'-hydroxyphenyl)-benzotriazoles, 2-hydroxy-4-alkoxybenzophenones, nickel containing light stabilizers, 3,5-di-tert-butyl-4-hydroxybenzoates, sterically hindered amines (HALS), or any combination thereof.

In one embodiment, a UV absorber may be present in the composition in lieu of or in addition to the light stabilizer. The UV absorber may include, but is not limited to, a benzotriazole, a benzoate, or a combination thereof, or any combination thereof.

In one embodiment, a halogenated flame retardant may be present in the composition. The halogenated flame retardant may include, but is not limited to, tetrabromobisphenol A (TBBA), tetrabromophthalic acid anhydride, dedecachloropentacyclooctadecadiene (dechlorane), hexabromocyclodedecane, chlorinated paraffins, or any combination thereof.

In one embodiment, a non-halogenated flame retardant may be present in the composition. The non-halogenated flame retardant may include, but is not limited to, resorcinol diphosphoric acid tetraphenyl ester (RDP), ammonium polyphosphate (APP), phosphine acid derivatives, triaryl phosphates, trichloropropylphosphate (TCPP), magnesium hydroxide, aluminum trihydroxide, antimony trioxide.

In one embodiment, a lubricant may be present in the composition. The lubricant may include, but is not limited to, silicone oil, waxes, molybdenum disulfide, or any combination thereof.

These additives may be used singly or in any combination thereof. In general, unless stated otherwise, if the additives are utilized, they may be present in an amount of at least about 0.05 wt. %, such as at least about 0.1 wt. %, such as at least about 0.25 wt. %, such as at least about 0.5 wt. %, such as at least about 1 wt. % and generally less than about 20 wt. %, such as less than about 10 wt. %, such as less than about 5 wt. %, such as less than about 4 wt. %, such as less than about 2 wt. %.

Once the composition is formulated, the different components can be mixed together and formed into a porous structure. In one aspect, one or more high density polyethylene polymers in the form of particles are combined with one or more chemical scavengers and any other desired additives and mixed together. For example, the components can be dry mixed using, for instance, a tumbler mixer, a motorized blender, or can be combined through shaking.

The polymer composite of the present disclosure can then be formed through a sintering process. Porous articles may be formed by a free sintering process which involves introducing the polyethylene polymer powder described above into either a partially or totally confined space, e.g., a mold, and subjecting the molding powder to heat sufficient to cause the polyethylene particles to soften, expand and contact one another. Suitable processes include compression molding and casting. The mold can be made of steel, aluminum or other metals. The polyethylene polymer powder used in the molding process is generally exreactor grade, by which is meant the powder does not undergo sieving or grinding before being introduced into the mold. The additives discussed above may of course be mixed with the powder.

The mold is heated in a convection oven, hydraulic press or infrared heater to a sintering temperature between about 140° C. and about 300° C., such as between about 160° C. and about 300° C., for example between about 170° C. and about 240° C. to sinter the polymer particles. The heating time and temperature vary and depend upon the mass of the mold and the geometry of the molded article. However, the heating time typically lies within the range of about 10 to about 100 minutes. During sintering, the surface of individual polymer particles fuse at their contact points forming a porous structure. Subsequently, the mold is cooled and the porous article removed. In general, a molding pressure is not required. However, in cases requiring porosity adjustment, a proportional low pressure can be applied to the powder.

In the above process, the components are dry mixed together and sintered. Alternatively, the different components can be combined together as a slurry and then sintered into a product. The use of a slurry can offer various advantages and benefits. For instance, by combining the components in a slurry, the buildup of static electricity can be avoided. In addition, using a slurry may prevent interparticle attractions from occurring that form agglomerants with the high density polyethylene polymer binder.

The slurry can be formed by combining the components with a liquid to form a slurry in which the particles remain in a mixture and are evenly dispersed. In one embodiment, for instance, the liquid can be water. When a leaching agent is present, however, the liquid can be selected so that the leaching agent is not soluble in the liquid. For instance, the liquid can be a solvent or an emulsion. Once combined with the liquid, the slurry can be mixed using agitation, tumbling, motorized blending, or shaking.

In one embodiment, the resulting slurry can be separated from the liquid portion by filtration or evaporation prior to charging the components into a mold and pressed into shape. Alternatively, the slurry can be charged directly into a mold or made into a shape followed by removal of the liquid portion by draining or evaporation.

After sintering, in one embodiment, the polymer composite can be contacted with a solvent, such as water, in order to remove any leaching agents that may be present in the product. After contact with the solvent, for instance, the polymer composite can contain one or more leaching agents in an amount less than about 3% by weight, such as in an amount less than about 2% by weight, such as in an amount less than about 1% by weight.

Polymer composite products made in accordance with the present disclosure can have any suitable shape. In one embodiment, for instance, the polymer composite can be formed into the shape of small solid structures that can then be used to form a filtering bed for contact with a fluid. The polymer composite product, in one aspect, has at least one dimension that has a length of greater than about 0.8 mm, such as greater than about 1 mm, such as greater than about 1.5 mm, such as greater than about 2 mm, such as greater than about 2.5 mm, such as greater than about 3 mm, such as greater than about 3.5 mm, such as greater than about 4 mm, such as greater than about 5 mm, and generally less than about 500 mm, such as less than about 400 mm, such as less than about 300 mm, such as less than about 200 mm, such as less than about 100 mm, such as less than about 80 mm, such as less than about 60 mm, such as less than about 40 mm, such as less than about 20 mm.

Referring to FIG. 1, one embodiment of a polymer composite product 10 made in accordance with the present disclosure is shown. In this example, the polymer composite product 10 is in the shape of a cylinder. For exemplary purposes only, for instance, in one embodiment, the cylinder can have a length of from about 2 mm to about 15 mm, including all increments of 1 mm therebetween. For instance, the cylinder can have a length of greater than about 2 mm, such as greater than about 3 mm, such as greater than about 4 mm, and generally less than about 12 mm, such as less than about 10 mm, such as less than about 8 mm, such as less than about 6 mm. The diameter of the cylinder can generally be greater than about 0.5 mm, such as greater than about 0.8 mm, such as greater than about 1 mm, such as greater than about 1.5 mm, such as greater than about 2 mm, such as greater than about 2.5 mm. The diameter of the cylinder can generally be less than about 12 mm, such as less than about 10 mm, such as less than about 8 mm, such as less than about 6 mm, such as less than about 4 mm. In one particular embodiment, the cylinders 10 can have a length of from about 3 mm to about 7 mm and a diameter of from about 1 mm to about 5 mm.

Figure 2:
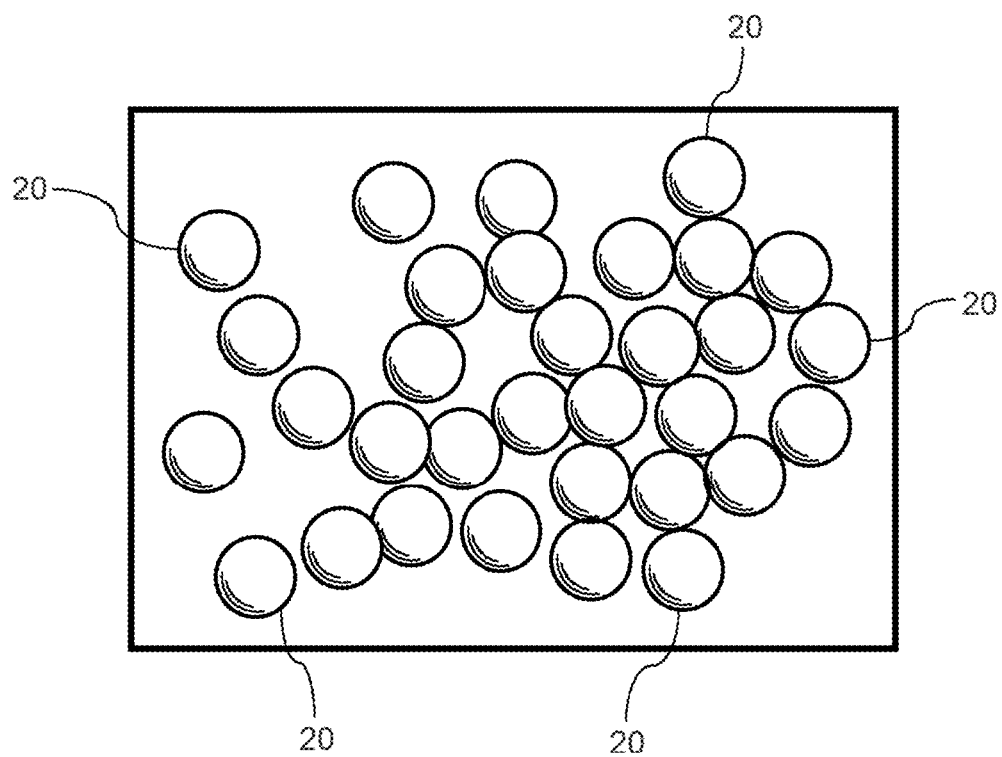
FIG. 2 is a plan view of another embodiment of a porous polymer composite product made in accordance with the present disclosure.

Referring to FIG. 2, another embodiment of a polymer composite product 20 made in accordance with the present disclosure is shown. In the embodiment illustrated in FIG. 2, the product 20 is in the shape of spheres. Again, the spheres can have any suitable size depending upon the particular application. For instance, the spheres can have a diameter of greater than about 0.5 mm, such as greater than about 0.8 mm, such as greater than about 1 mm, such as greater than about 1.5 mm, such as greater than about 2 mm, such as greater than about 2.5 mm, such as greater than about 3 mm, and generally less than about 12 mm, such as less than about 10 mm, such as less than about 8 mm, such as less than about 6 mm, such as less than about 4 mm, such as less than about 2 mm.

Figure 5:
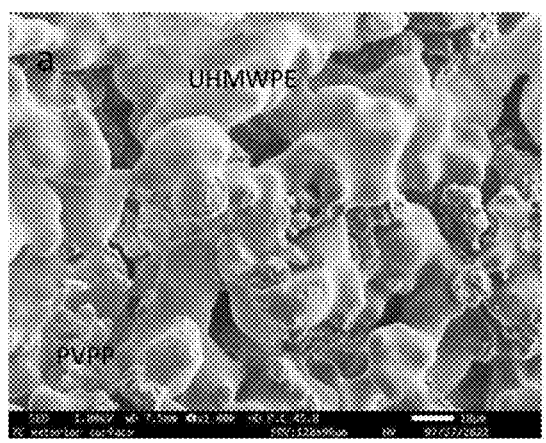
FIG. 5 is a cross sectional view of one embodiment of a porous polymer composite made in accordance with the present disclosure.
Figure 6:
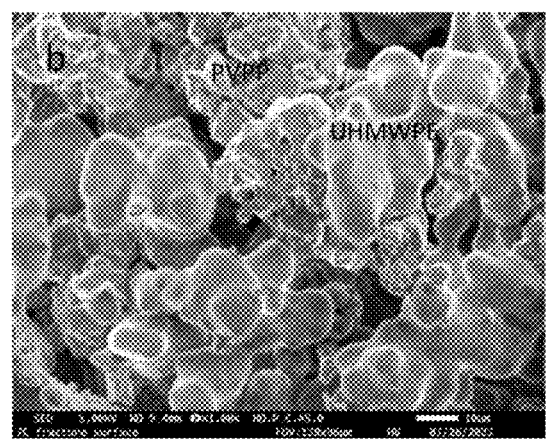
FIG. 6 is a cross sectional view of another embodiment of a porous polymer composite made in accordance with the present disclosure.

Referring to FIGS. 5 and 6, cross sectional views of a porous polymer composite made in accordance with the present disclosure are illustrated. As shown, the chemical scavenger is contained within the porous binder network.

In other embodiments, various other shapes can be used. As shown in FIGS. 1 and 2, non-planar and non-tubular shapes have been found to be particularly well suited for filtering fluids in accordance with the present disclosure, especially in view of the porous structure of products made according to the present disclosure. In other embodiments, however, the polymer composite product can be in the shape of disks that may provide a large surface area on at least two surfaces. For instance, each disk can have a thickness of less than about 3 mm, such as less than about 1 mm, and can have a diameter of from about 4 mm to about 12 mm, including all increments of 1 mm therebetween.

In one embodiment, the polymer composite product is net shape molded, meaning that the size and shape of the product is not changed after sintering and exiting the mold. In other embodiments, however, the polymer composite can be formed in accordance with the present disclosure and then cut or ground to a desired size and/or shape. For example, in one embodiment, the polymer composite can be formed into a long rod or into any of the shapes illustrated in FIGS. 1 and 2 and then subjected to a grinding process that produces a granular product with irregular shapes. The ground product, however, still can maintain at least one largest dimension of greater than about 0.8 mm, such as greater than about 1 mm, such as greater than about 1.5 mm, such as greater than about 2 mm, such as greater than about 2.5 mm. Grinding the product into irregular shapes can produce an irregular surface that may provide greater surface area for contact with fluids.

Polymer composites made according to the present disclosure offer numerous advantages and benefits due to the properties that are obtained through the selection of materials and the sintering process as described above. For example, polymer composites made according to the present disclosure can contain one or more chemical scavengers in relatively great amounts. One or more chemical scavengers can be incorporated into the polymer composite, for instance, in an amount greater than about 10% by weight, such as in an amount greater than about 20% by weight, such as in an amount greater than about 30% by weight, such as in an amount greater than about 40% by weight, such as in an amount greater than about 42% by weight, such as in an amount greater than about 45% by weight, such as in an amount greater than about 50% by weight, such as in an amount greater than about 60% by weight, such as in an amount greater than about 70% by weight, such as in an amount greater than about 80% by weight. One or more chemical scavengers can be present in the polymer composite generally in an amount less than about 90% by weight, such as in an amount less than about 70% by weight, such as in an amount less than about 60% by weight, such as in an amount less than about 50% by weight. In certain embodiments, however, it may be preferred to produce a polymer composite having relatively low amounts of the chemical scavenger. For instance, porous products can be made in which one or more chemical scavengers are present in an amount less than about 20% by weight, such as in an amount less than about 15% by weight, such as in an amount less than about 10% by weight, and generally in an amount greater than about 2% by weight, such as in an amount greater than about 5% by weight.

As described above, in one embodiment, the chemical scavenger can be a vinyl lactam polymer, such as a polyvinyl polypyrrolidone polymer. It is found that this chemical scavenger can be incorporated into the polymer composite in amounts greater than about 39% by weight, such as in amounts greater than about 40% by weight, such as in amounts greater than about 42% by weight, such as in amounts greater than about 44% by weight, such as in amounts greater than about 46% by weight, such as in amounts greater than about 48% by weight, such as in amounts greater than about 50% by weight, such as in amounts greater than about 55% by weight, such as in amounts greater than about 60% by weight, and generally in amounts less than about 85% by weight, such as in amounts less than about 80% by weight.

In addition to having relatively high loading of one or more chemical scavengers, the polymer composites of the present disclosure can be formed with excellent pore structures that facilitate contact with fluids in order to remove contaminants from the fluid. For instance, the polymer composite can have a porosity of greater than about 10%, such as greater than about 15%, such as greater than about 20%, such as greater than about 25%, such as greater than about 30%, such as greater than about 35%, such as greater than about 40%, such as greater than about 45%, such as greater than about 50%, such as greater than about 55%, such as greater than about 60%, such as greater than about 65%, and generally less than about 85%, such as less than about 80%, such as less than about 70%. Porosity can be determined according to DIN Test 66133.

Average pore size which can also be determined according to Test DIN 66133 can generally be greater than about 4 nm, such as greater than about 4.2 nm, such as greater than about 4.4 nm, such as greater than about 4.6 nm, such as greater than about 4.8 nm, such as greater than about 5 nm, such as greater than about 5.2 nm, such as greater than about 5.4 nm, such as greater than about 5.6 nm, and less than about 30 nm, such as less than about 20 nm, such as less than about 15 nm, such as less than about 10 nm, such as less than about 8 nm.

The polymer composites can also display a BET surface area of greater than about 0.03 $m^2/g$, such as greater than about 0.05 $m^2/g$, such as greater than about 0.07 $m^2/g$, such as greater than about 0.09 $m^2/g$, such as greater than about 0.11 $m^2/g$, such as greater than about 0.13 $m^2/g$, such as greater than about 0.15 $m^2/g$, such as greater than about 0.17 $m^2/g$, such as greater than about 0.19 $m^2/g$, such as greater than about 0.21 $m^2/g$, such as greater than about 0.23 $m^2/g$, such as greater than about 0.25 $m^2/g$, such as greater than about 0.27 $m^2/g$, such as greater than about 0.29 $m^2/g$, such as greater than about 0.31 $m^2/g$, such as greater than about 0.33 $m^2/g$, such as greater than about 0.35 $m^2/g$, such as greater than about 0.37 $m^2/g$, and less than about 0.7 $m^2/g$. BET surface area can be measured according to ISO Test 9277:2010.

Porous polymer composites made according to the present disclosure can be used in numerous and diverse applications for removing chemical species from a fluid, such as a liquid stream. For instance, the porous polymer composite products of the present disclosure can be used to contact fluids in a water treatment process, in the food and beverage industry, in the pharmaceutical industry, in the oil and gas industry, in the chemical industry, in the pulp and paper industry, and the like. The polymer composite product of the present disclosure, for instance, can be used to remove trace amounts of metals, proteins, polypeptides, organic compounds, and the like from any liquid body or stream.

For example, in many pharmaceutical manufacturing processes, metal contaminants need to be removed during different stages of the process. For example, transition-metal catalysts are typically used to construct chemicals, including small molecule pharmaceuticals. Although use of the catalysts provide numerous advantages to producing the compounds, the catalysts have a tendency to produce metal species which become a contaminant that can have an adverse impact on downstream chemical processes. In addition, many government regulations and guidelines require that metal impurities be maintained below certain levels in final active pharmaceutical ingredients. The porous polymer composites of the present disclosure are particularly well suited to removing metal contaminants in pharmaceutical processes without any adverse impact upon the final product.

In one embodiment, the polymer composite of the present disclosure can be used to remove a precious metal, particularly rhodium, from a carbonylation process. One particularly significant industrial process is the carbonylation of methanol to make acetic acid. To make acetic acid, methanol is carbonylated in a reaction medium wherein rhodium is utilized as a catalyst. The catalyst has a tendency to form volatile species which leads to catalyst loss and rhodium becomes entrained in the process streams. The polymer composite product of the present disclosure is particularly well suited for removing rhodium from a liquid stream in a carbonylation process.

The carbonylation apparatus or process includes generally at least a reactive section, and a purification section. The process may include, for example, the carbonylation of methanol with carbon monoxide in a homogeneous catalytic reaction system comprising a reaction solvent (typically acetic acid), methanol and/or its reactive derivatives, a soluble rhodium catalyst, at least a finite concentration of water, as well as the porous scavenger product of the present disclosure. The carbonylation reaction proceeds as methanol and carbon monoxide are continuously fed to the reactor. The carbon monoxide reactant may be essentially pure or may contain inert impurities such as carbon dioxide, methane, nitrogen, noble gases, water and C1 to C4 paraffinic hydrocarbons. The presence of hydrogen in the carbon monoxide and generated in situ by the water gas shift reaction is preferably kept low, for example, less than 1 bar partial pressure, as its presence may result in the formation of hydrogenation products. The partial pressure of carbon monoxide in the reaction is suitably in the range 1 to 70 bar, preferably 1 to 35 bar, and most preferably 1 to 15 bar.

The pressure of the carbonylation reaction is suitably in the range 10 to 200 bar, preferably 10 to 100 bar, most preferably 15 to 50 bar. The temperature of the carbonylation reaction is suitably in the range 100 to 300° C., preferably in the range 150 to 220° C. Acetic acid is typically manufactured in a liquid phase reaction at a temperature of from about 150-200° C. and a total pressure of from about 20 to about 50 bar.

Acetic acid is typically included in the reaction mixture as the solvent for the reaction.

Suitable reactive derivatives of methanol include methyl acetate, dimethyl ether, methyl formate and methyl iodide. A mixture of methanol and reactive derivatives thereof may be used as reactants in the process. Preferably, methanol and/or methyl acetate are used as reactants. At least some of the methanol and/or reactive derivative thereof will be converted to, and hence present as, methyl acetate in the liquid reaction composition by reaction with acetic acid product or solvent. The concentration in the liquid reaction composition of methyl acetate is suitably in the range 0.5 to 70% by weight, preferably 0.5 to 50% by weight, more preferably 1 to 35% by weight and most preferably 1-20% by weight.

Water may be formed in situ in the liquid reaction composition, for example, by the esterification reaction between methanol reactant and acetic acid product. Water may be introduced to the carbonylation reactor together with or separately from other components of the liquid reaction composition. Water may be separated from other components of reaction composition withdrawn from the reactor and may be recycled in controlled amounts to maintain the required concentration of water in the liquid reaction composition. The concentration of water can be maintained in the liquid reaction composition is in the range 0.1 to 16% by weight.

The reaction liquid is typically drawn from the reactor and flashed in a one step or multi-step process using a converter as well as a flash vessel as hereinafter described. The crude vapor process stream from the flasher is sent to a purification system which generally includes at least a light ends column and a dehydration column.

In accordance with the present disclosure, a process stream that may be located in the purification section containing rhodium can be contacted and treated with the porous polymer composite product of the present disclosure. For example, in one embodiment, the composite polymer product contains a rhodium scavenger comprising a polymer with nitrogen-containing heterocyclic repeat units. The chemical scavenger incorporated into the polymer composite, for instance, can be a vinyl pyrrolidone polymer, a vinyl pyridine polymer, or the like. As described above, the polymer with the nitrogen-containing heterocyclic ring can be crosslinked. The degree of crosslinking can be greater than about 10%, such as greater than about 20%, and generally less than about 75%, such as less than about 60%, such as less than about 50%.

The process stream being treated in accordance with the present disclosure can contain very low amounts of the contaminant, such as rhodium. For instance, the amount of rhodium in the process stream can be less than about 10,000 ppb, such as less than about 1,000 ppb, such as less than about 500 ppb, such as less than about 300 ppb, such as less than about 200 ppb, such as less than about 100 ppb, such as even less than about 50 ppb. The polymer composite of the present disclosure can effectively remove all of the rhodium from the process stream such that rhodium levels are below detectable limits.

After scavenging the rhodium or metal ion, the metal ion can be subsequently recovered by digesting the polymer through incineration or according to a process in which the polymer composite can be reused. For instance, an ion-exchange regeneration technique can be used with ammonium salts, sulfuric acid, or hydrochloric acid for recovering the metal.

In one embodiment, sequestered catalyst metal is removed from the resin by using a regenerant including a regenerant solvent and one or more regenerating agents compatible with the reaction system. The recovered catalyst metal can then be directly recycled to the reactor and the resin re-used to improve system economics and reduce environmental impact. Suitable regenerant solvents for regenerating the resin include water, acetic acid, methyl acetate, methyl formate methanol and mixtures thereof. Suitable regenerating agents include soluble Group IA and Group IIA metal salts and hydroxides as well as hydrogen halides. Exemplary regenerant compositions for regenerating the resin bed thus include aqueous solutions of: lithium acetate; lithium carbonate; lithium hydroxide; lithium iodide; hydrogen iodide; potassium hydroxide; potassium iodide; sodium acetate; sodium iodide; sodium carbonate; sodium hydroxide and so forth.

Figure 3:
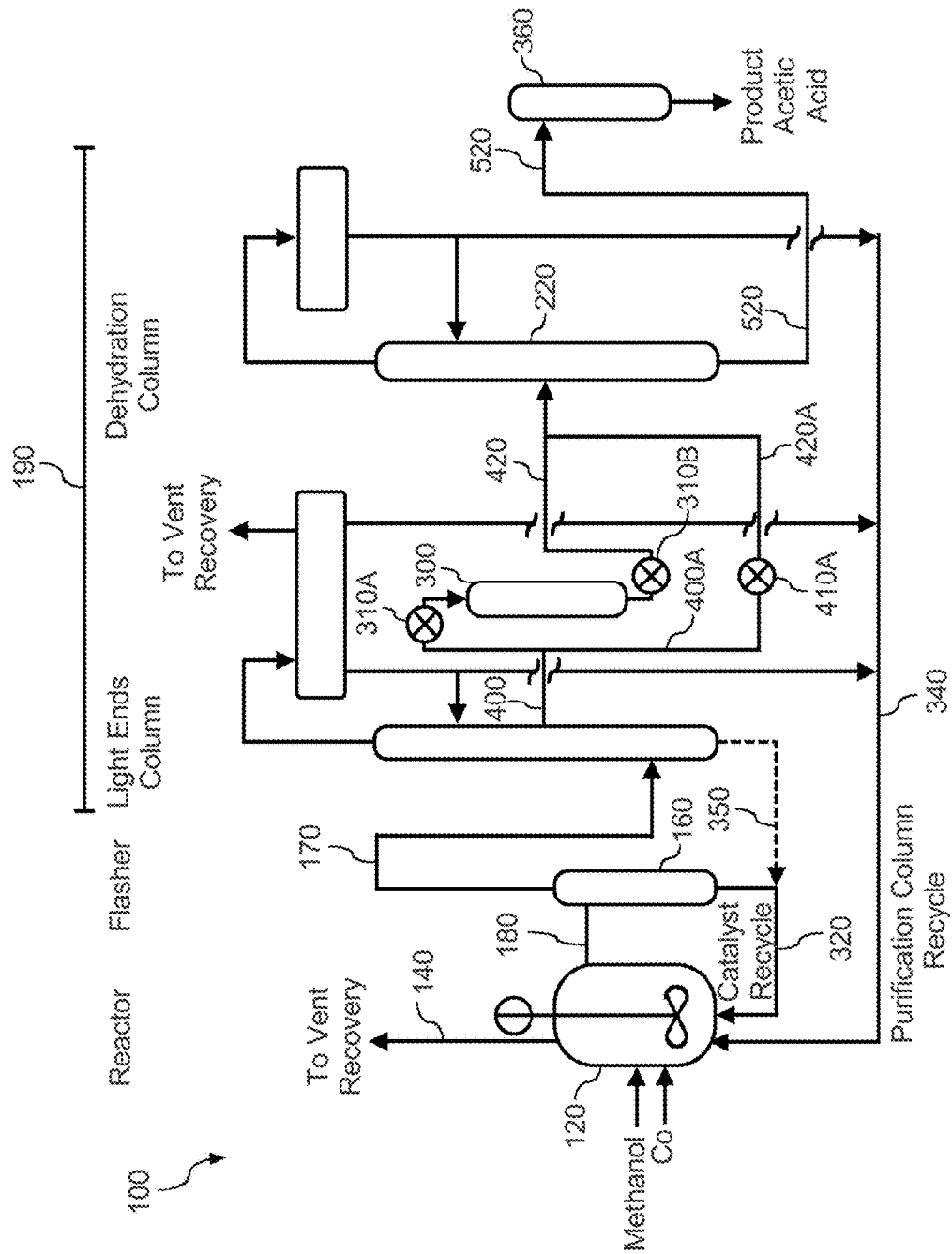
FIG. 3 is a diagram of one embodiment of a carbonylation process in accordance with the present disclosure.

Referring to FIG. 3, a schematic diagram is shown illustrating a typical carbonylation process which includes a catalyst sequestering system. In FIG. 3, there is shown a carbonylation system 100 including a reactor 120 provided with a vent 140. Reactor 120 is coupled to a flasher 160 by way of a conduit 180. The flasher, in turn, is coupled to a purification section 190 which comprises generally a light ends column 200, a dehydration column 220 and a strong acid, silver-exchanged cation ion-exchange resin bed 360 which removes iodides from the product.

A gaseous purge stream is typically vented from the head of the reactor to prevent buildup of gaseous by-products such as methane, carbon dioxide and hydrogen and to maintain a set carbon monoxide partial pressure at a given total reactor pressure. Optionally, a so-called "converter" reactor can be employed which is located between the reactor and flasher vessel shown in FIGS. 3 and 4. The "converter" produces a vent stream comprising gaseous components which are typically scrubbed with a compatible solvent to recover components such as methyl iodide and methyl acetate. The gaseous purge streams from the reactor and converter can be combined or scrubbed separately and are typically scrubbed with either acetic acid, methanol or mixtures of acetic acid and methanol to prevent loss of low boiling components such as methyl iodide from the process. If methanol is used as the vent scrub liquid solvent, the enriched methanol from the scrubbing system is typically returned to the process by combining with the fresh methanol feeding the carbonylation reactor, although it can also be returned into any of the streams that recycle back to the reactor such as the flasher residue or light ends or dehydration column overhead streams. If acetic acid is used as the vent scrub liquid solvent, the enriched acetic acid from the scrubbing system is typically stripped of absorbed light ends and the resulting lean acetic acid is recycled back to the absorbing step. The light end components stripped from the enriched acetic acid scrubbing solvent can be returned to the main process directly or indirectly in several different locations including the reactor, flasher, or purification columns. Optionally, the gaseous purge streams may be vented through the flasher base liquid or lower part of the light ends column to enhance rhodium stability and/or they may be combined with other gaseous process vents (such as the purification column overhead receiver vents) prior to scrubbing.

In accordance with the present disclosure, a bed comprising the polymer composite product of the present disclosure is present in the process as indicated at 300 on the purified process stream 400.

As will be appreciated by one of skill in the art, the different chemical environments encountered in the purification train may require different metallurgy. For example, a resin bed at the outlet of the light ends column will likely require a zirconium vessel due to the corrosive nature of the process stream, while a vessel of stainless steel may be sufficient for resin beds placed downstream of this dehydration column where conditions are much less corrosive.

Carbon monoxide and methanol are introduced continuously into reactor 112 with adequate mixing at a high carbon monoxide partial pressure. The non-condensable bi-products are vented from the reactor to maintain an optimum carbon monoxide partial pressure. The reactor off gas is treated to recover reactor condensables, i.e., methyl iodide before flaring. Methanol and carbon monoxide efficiencies are preferably greater than about 98 and 90% respectively.

From the reactor, a stream of the reaction mixture is continuously fed via conduit 180 to flasher 160. Through the flasher the product acetic acid and the majority of the light ends (methyl iodide, methyl acetate, water) are separated from the reactor catalyst solution, and the crude process stream 170 is forwarded with dissolved gases to the distillation or purification section 190 in a single stage flash. The catalyst solution is recycled to the reactor via conduit 320. Under the process conditions of the flash, rhodium is susceptible to deactivation at the low carbon monoxide partial pressures in the flash vessel and may be entrained to purification system 190.

The purification of the acetic acid typically includes distillation in a light ends column, a dehydration column, and, optionally, a heavy ends column. The crude vapor process stream 170 from the flasher is fed into the light ends column 200. Methyl iodide, methyl acetate, and a portion of the water condense overhead in the light end columns to form two phases (organic and aqueous). Both overhead phases return to the reaction section via recycle line 340. The dissolved gases from the light ends column vent through the distillation section. Before this vent stream is flared, residual light ends are scrubbed and recycled to the process. Optionally, a liquid recycle stream 350 from the light ends column may also be returned to the reactor.

The purified process stream 400 can be drawn off the side of the light end column 200 and fed to a vessel 300 containing the porous polymer composite product of the present disclosure. The vessel 300, for instance, can be filled with cylinders, spheres, or other shapes as may be desired formed from the polymer composite. As described above, the polymer composite contains a nitrogen-containing resin that is well adapted to removing precious metals, such as rhodium.

The exit process stream 420 from the polymer bed is then fed into dehydration column 220. Water and some acetic acid from this column separate and are recycled to the reaction system via recycle line 340 as shown. The purified and dried process stream 520 from the dehydration column 220 feeds resin bed 360 and product is taken therefrom as shown. Carbonylation system 100 uses only two purification columns and is preferably operated as described in more detail in U.S. Pat. No. 6,657,078 and in U.S. Pat. No. 7,902,398, which are both incorporated herein by reference.

System 100 is optionally provided with a bypass lines 400A, 420A with a valve 410A. Bed 300 has a pair of valves 310A, 310B which can be used to isolate the bed during regeneration or replacement of the resin. For example, during normal operation, valves 310A, 310B are open and valve 410A is closed so that the process stream is treated in resin bed 300. If so desired, some or all of the process stream may be directed through lines 400A, 420A by opening valve 410A and closing, or partially closing, valves 310A, 310B.

In FIG. 3, the product acetic acid is afforded as the residue of the dehydration column as shown.

Figure 4:
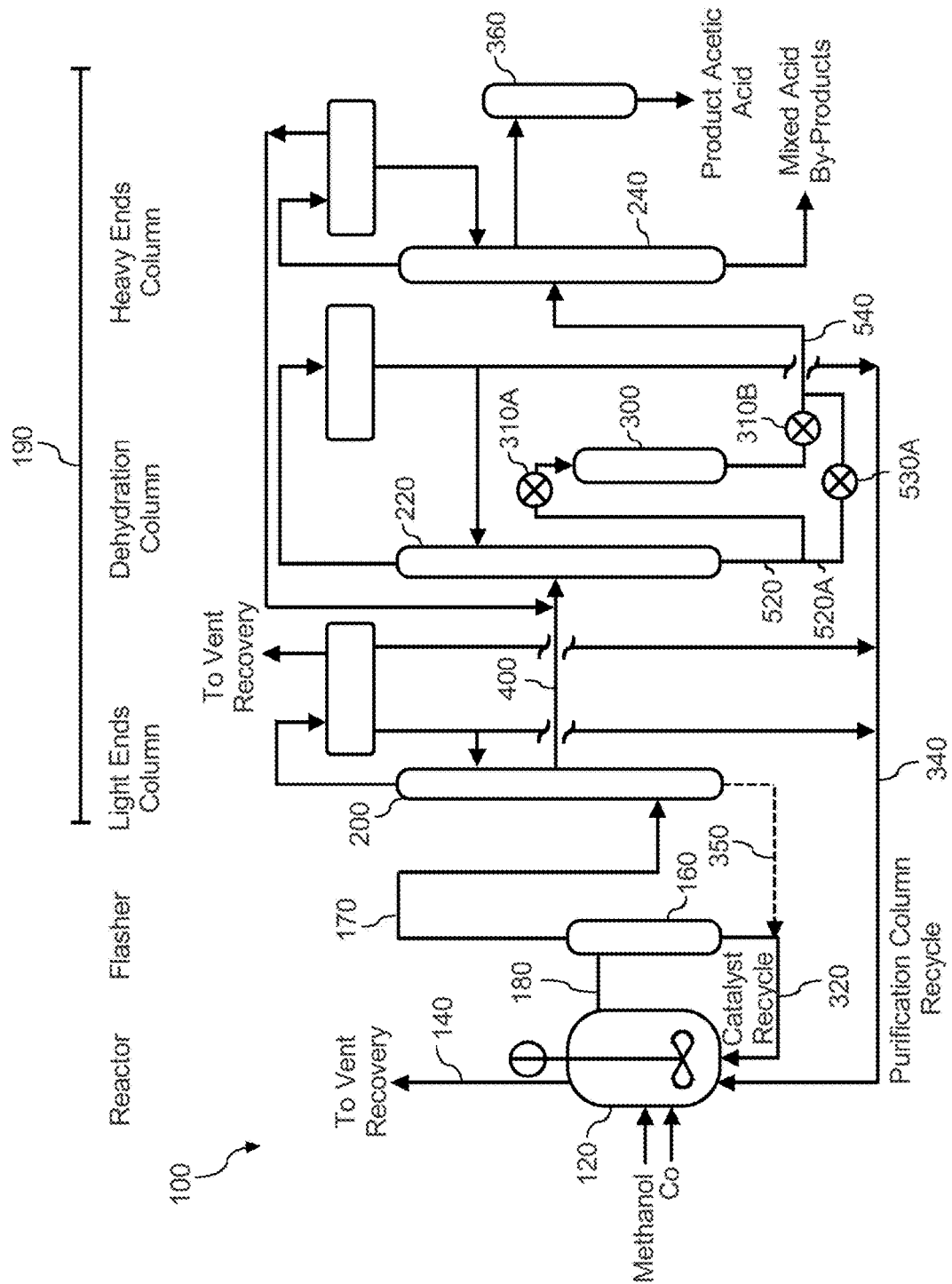
FIG. 4 is a diagrammatic view of another embodiment of a carbonylation process in accordance with the present disclosure.

FIG. 4 illustrates another embodiment where the process is similar to the one described in connection with FIG. 3, except the catalyst sequestering unit 300 is positioned after the dehydration column 220 and a heavy ends purification column is included. Here, the purified and dried process stream 520 from the dehydration column 220 is fed into polymer bed 300. The exit process stream 540 from the polymer bed 300 is then fed into a heavy ends column 240 which, in turn, feeds iodide removal bed 360 via a side drawn from the column.

System 100 of FIG. 4 is likewise optionally provided with a bypass line 520A with a valve 530A. Bed 300 has a pair of valves 310A, 310B which can be used to isolate the bed during regeneration or replacement of the resin, as is noted above.

The polymer composite of the present disclosure can be used in other numerous processes in addition to the process described above for making acetic acid. For instance, the porous polymer composite of the present disclosure can be used to remove contaminants, such as metal ions, from a liquid stream during the production of a beverage. Metal ions, for instance, can be present in a beverage stream as a contaminant from process waters for cleaning. The polymer composite of the present disclosure can contain any suitable chemical scavenger for removing any metal contained in the beverage stream.

In an alternative embodiment, the polymer composite product of the present disclosure can be used to remove polypeptides and/or polyphenols from liquid streams, such as liquid streams that are used to produce beverages, such as beer. In this regard, the polymer composite of the present disclosure can be formulated so as to be completely safe for food contact applications.

In addition to beer, various other beverages that can be filtered using the polymer composite of the present disclosure include other alcoholic beverages including wine, cider, whiskey, gin, rum, tequila, brandy, and vodka. Other beverages include various fruit juices including apple juice, orange juice, pineapple juice, peach juice, pear juice, and cranberry juice. In still another embodiment, the treated liquid can be a vinegar, such as a malt vinegar, a wine vinegar, or a cider vinegar.

In each of the above described beverages, the beverages can be contacted with the polymer composite containing a vinyl lactam polymer for removing polyphenols, polypeptides, proteins, and the like. Even if the beverages contain very small amounts of polyphenols, the polymer composite product of the present disclosure can remove the polyphenols to undetectable levels.

The present disclosure may be better understood with reference to the following examples.

EXAMPLES

Example No. 1

Various different high density polyethylene polymers were combined with either a polybenzimidazole (PBI) powder or a polyvinyl polypyrrolidone (PVPP) powder. The PBI powder and the PVPP powder both had an average particle size of less than about 100 microns. Each formulation contained 60% by weight high density polyethylene and 40% by weight of PBI or PVPP. The formulations were dry mixed, charged into a 0.25 inch ID aluminum tubing and placed inside a preheated oven at 160° C. under nitrogen for 20 to 30 minutes. The following results were obtained:

| Sample No. | d50 (μm) (Laser scattering) | Bulk density (g/cc) | Ave. mol wt (Margolies' Equation) | Functionalized resin (40% wt) | Results of sintering at 160° C., 30 min |
|---|---|---|---|---|---|
| 1 | 30-2126 | 0.28 | 4.2E6 | PBI | Sinterable |
| 2 | 60-4050 | 0.44 | 7.3E6 | PBI | Not sinterable |
| 3 | 130-2122 | 0.25 | 4.2E6 | PBI | Not sinterable |
| 4 | 30 | 0.28 | 4.2E6 | PVPP (DR50 = 120 um) | Sinterable |
| 5 | 60 | 0.44 | 7.3E6 | PVPP (DR50 = 120 um) | Not sinterable |
| 6 | 130 | 0.25 | 4.2E6 | PVPP (DR50 = 120 um) | Sinterable |
| 7 | 30 | 0.28 | 4.2E6 | PVPP (DR50 = 25 um) | Sinterable |
| 8 | 60 | 0.44 | 7.3E6 | PVPP (DR50 = 25 um) | Not sinterable |
| 9 | 130 | 0.25 | 4.2E6 | PVPP (DR50 = 25 um) | Not sinterable |

As shown above, high density polyethylene particles having a smaller size performed better. The small sized particles also were non-spherical and had a multi-lobal shape. During this example, the formulations were sintered into cylinders having a diameter of 3 mm and a length of 5 mm.

Another sample was then formulated similar to Sample No. 5 above. However, this sample contained 25% by weight PBI. The composition was sintered into the shape of a cylinder successfully. The sintered product was then placed in acetic acid at 100° C. for 24 hours. The composite material retained its shape.

Example No. 2

In this example, a high density polyethylene polymer was combined with a PBI powder and a leaching agent. The leaching agent was sodium chloride. Sample Nos. 10-16 were formed similar to the sintered products described in Example No. 1. Sample Nos. 17 and 18, however, were formed from a slurry. In Sample No. 17, the components were combined with methanol and then sintered. In Sample No. 18, on the other hand, the components were combined with acetone and sintered. The high density polyethylene particles used in this example had an average particle size of 30 microns and had a bulk density of 0.28 g/cc. The following table shows the relative amounts of the components and the results.

| Sample No. | % Binder | % functional resin (PBI) | % leachable component (50 μm NaCl) | Results of sintering at 160° C., 30 min |
|---|---|---|---|---|
| 10 | 60 | 40 | 0 | Sinterable |
| 11 | 60 | 35 | 5 | Not sinterable |
| 12 | 65 | 35 | 0 | Sinterable |
| 13 | 65 | 30 | 5 | Sinterable |
| 14 | 65 | 25 | 10 | Sinterable |
| 15 | 65 | 20 | 15 | Sinterable |
| 16 | 65 | 15 | 20 | Sinterable |
| 17 | 65 | 25 | 10 | Sinterable |
| 18 | 65 | 25 | 10 | Sinterable |

As shown above, the presence of sodium chloride did not impact the ability of the composition to be sintered. In addition, it was noticed that the presence of the sodium chloride after contact with water significantly changed the pore structure of the cylinders that were produced.

Example No. 3

In this example, the same process as described in Example No. 1 was followed in order to produce sintered products. In this example, however, various different chemical scavengers were used. All of the chemical scavengers were supported on a silica support. The high density polyethylene particles used in this example had an average particle size of 30 microns and a bulk density of 0.28 g/cc. As shown in the table below, all of the formulations were successfully sintered into products.

| Sample No. | Chemical Scavenger | % wt functional resin | % wt UHMWPE binder | Results of sintering at 160° C., 30 min |
|---|---|---|---|---|
| 19 | "Aminoalkyl 3 silica" | 35 | 65 | Sinterable |
| 20 | "Aminoalkyl 1 silica" | 35 | 65 | Sinterable |
| 21 | "Mercaptoalkyl 1" | 35 | 65 | Sinterable |

-continued

| Sample No. | Chemical Scavenger | % wt functional resin | % wt UHMWPE binder | Results of sintering at 160° C., 30 min |
|---|---|---|---|---|
| 22 | "Mercaptoalkyl 4" | 35 | 65 | Sinterable |
| 23 | "Alkyl thiourea" | 35 | 65 | Sinterable |

As shown above, all of the chemical scavengers were capable of being trapped or encased within the porous structure. In this example, all of the chemical scavengers had a particle size of from about 200 microns to about 500 microns.

Example No. 4

Sample No. 19 above was repeated except, in some samples, sodium chloride was added. The following results were obtained:

| Sample No. | % UHMWPE Resin | % Chemical Scavenger | % NaCl (<50 um) | Results of sintering at 160° C., 30 min |
|---|---|---|---|---|
| 24 | 65 | 35 | 0 | Sinterable |
| 25 | 55 | 30 | 15 | Sinterable |
| 26 | 20 | 80 | 0 | Sinterable |
| 27 | 20 | 65 | 15 | Sinterable |
| 28 | 20 | 60 | 20 | Sinterable |

After the formulations were sintered, the resulting products were contacted with water that contained sodium chloride to remove the sodium chloride. As shown above, all of the above formulations were successfully formed into the cylinders. In addition, Sample No. 26 shows that 80% of a chemical scavenger can be incorporated into the product and the product is still capable of being sintered into a desired shape.

Example No. 5

In this example, the high density polyethylene particles having an average particle size of 30 microns and having a bulk density of 0.28 g/cc was combined with PVPP as described in Example No. 1. In some of the examples, sodium chloride was added as a leaching agent. The following formulations were prepared and the following results were obtained:

| Sample No. | % UHMWPE Resin | % PVPP (d50: (<100 μm) | % NaCl (<50 um) | Results of sintering at 160° C., 30 min |
|---|---|---|---|---|
| 29 | 60 | 40 | 0 | Sinterable |
| 30 | 65 | 35 | 0 | Sinterable |
| 31 | 65 | 30 | 5 | Sinterable |
| 32 | 65 | 25 | 10 | Sinterable |
| 33 | 65 | 20 | 15 | Sinterable |
| 34 | 20 | 60 | 20 | Not Sinterable |

As shown above, a sinterable product was produced containing 40% by weight PVPP. This is an unexpectedly high loading level.

For Sample Nos. 31 through 33, the sintered product was contacted with water to remove the sodium chloride and a noticeable difference in porosity was observed.

Example No. 6

443 Further compositions were formulated and the process described in Example No. 1 was repeated. In this example, the high density polyethylene particles had an average particle size of 30 microns and had a bulk density of 0.28 g/cc. The polyethylene particles were combined with a PVPP powder. The PVPP powder had an average particle size of 122 microns and thus was larger in size than the PVPP used in Example No. 1. In some of the compositions, sodium chloride was added as a leaching agent.

The following results were obtained:

| Sample No. | % UHMWPE Resin | % wt PVPP | % wt NaCl (<50 μm) | Results of sintering at 160° C., 30 min |
|---|---|---|---|---|
| 35 | 60 | 40 | 0 | Sinterable |
| 36 | 65 | 35 | 0 | Sinterable |
| 37 | 65 | 30 | 5 | Sinterable |
| 38 | 65 | 25 | 10 | Sinterable |
| 39 | 65 | 20 | 15 | Sinterable |
| 40 | 20 | 65 | 15 | Not sinterable |

Example No. 7

Further compositions were formulated and tested similar to the process described in Example No. 1. The chemical scavenger used in this example was PVPP. The high density polyethylene used to produce the polymer composite was varied. In some examples, two different high density polyethylene polymers were used. More particularly, each sample contained 60% by weight high density polyethylene particles. The following samples contained the following polyethylene polymers:

| Sample No. | UHMWPE Binder Characteristics |
|---|---|
| 41 | 100% UHMWPE, D50 = 130 microns, 0.25 g/cc, 4.2E6 molecular weight |
| 42 | 100% UHMWPE, D50 = 30 microns, 0.28 g/cc, 4.2E6 molecular weight |
| 43 | 20% Sample No. 41 and 80% Sample No. 42 |
| 44 | 50% Sample No. 41 and 50% Sample No. 42 |
| 45 | 80% Sample No. 41 and 20% Sample No. 42 |

The above high density polyethylene particles were contained in each sample in an amount of 60% by weight and combined with 40% by weight PVPP. The following results were obtained:

| Sample No. | % PVPP | PVPP d50 μm | Results of sintering at 160° C., 30 min |
|---|---|---|---|
| 41 | 40 | <100 | Sinterable |
| 42 | 40 | >100 | Sinterable |
| 43 | 40 | >100 | Sinterable |
| 44 | 40 | >100 | Sinterable |
| 45 | 40 | >100 | Sinterable |

As shown, all of the samples prepared were capable of forming a sintered product even at a 40% loading amount of chemical scavenger. Combining first and second polyethylene resins together to create polymer composites can produce porous structures having a bimodal pore size.

Example No. 8

In this example, polymer compositions were formulated containing 60% by weight high density polyethylene particles combined with 40% by weight PVPP. The PVPP powder had an average particle size of 122 microns. The high density polyethylene polymer used had an average particle size of 30 microns, a bulk density of 0.28 g/cc, and a molecular weight of 4.2E6 g/mol. The process described in Example No. 1 was repeated in an attempt to produce sintered products. The sintering temperature was changed. The following results were obtained:

| Sample No. | % GUR binder | % PVPP | Temp (° C.) | Results of sintering for 30 min |
|---|---|---|---|---|
| 46 | 60% | 40 | 140 | Not sinterable |
| 47 | 60% | 40 | 150 | Sinterable |
| 48 | 60% | 40 | 160 | Sinterable |
| 49 | 60% | 40 | 190 | Sinterable |

Example No. 9

In this example, polymer compositions were formulated containing 65% by weight high density polyethylene particles combined with PVPP or PBI. In some samples, sodium chloride was added. The high density polyethylene polymer used had an average particle size of 30 microns, a bulk density of 0.28 g/cc, and a molecular weight of 4.2E6 g/mol. The process described in Example No. 1 was repeated to produce sintered products. For the samples containing sodium chloride, the sodium chloride was removed using a solvent. The samples were tested for BET surface area and average pore size. The following results were obtained:

| Sample No. | Composition | BET Surface Area (m2/g) | Average Pore Size (nm) |
|---|---|---|---|
| 50 | 65% UHMWPE, 35% PVPP | 0.07 | 5.5 |
| 51 | 65% UHMWPE, 25% PVPP, 10% NaCl | 0.35 | 5.0 |
| 52 | 65% UHMWPE, 35% PBI | 0.12 | 5.3 |
| 53 | 65% UHMWPE, 25% PBI, 10% NaCl | 0.38 | 5.8 |

Example No. 10

C Composites made according to the present disclosure were tested for chemical scavenger properties.

The following polymer compositions were formulated and formed into sintered composites. The high density polyethylene particles had an average particle size of 30 microns, a bulk density of 0.28 g/cc and a molecular weight of 4.2E6 g/mol. The high density polyethylene particles were combined with different chemical scavengers.

| Sample No. | Composite formulation (Binder/Scavenger/Porogen) | % UHMWPE Binder | % Scavenger | % Porogen |
|---|---|---|---|---|
| 32 | UHMWPE/PVPP/NaCl | 65 | 25 | 10 |
| 14 | UHMWPE/PBI/NaCl-washed | 65 | 25 | 10 |
| 54 | UHMWPE/Silica functionalized Imidazole | 65 | 25 | 10 |
| 55 | UHMWPE/Silica functionalized Triamine | 65 | 25 | 10 |
| 56 | UHMWPE/Silica functionalized Cysteine | 65 | 25 | 10 |
| 57 | UHMWPE/Silica functionalized Thiourea | 65 | 25 | 10 |

Screening Method 1. An aqueous mixed metal solution was prepared by using commercially available "Calibration Standard 2 without Mercury For ICP/MS, SPEX CertiPrep™ (cat no. CLMS2N)" containing the following cation of Ag, Al, As, Ba, Be, Bi, Ca, Cd, Co, Cr, Cs, Cu, Fe, Ga, In, K, Li, Mg, Mn, Na, Ni, Pb, Rb, Se, Sr, TI, U, V and Zn. A 20 ml aliquot is combined with 1 g of composite resins (see table for formulation) and allowed to mix for 2 days at room temperature. The mixtures were filtered and analyzed for metal ion content by ICP/OES. The following results were obtained (Data shows % cation removal from initial concentration after 2 days stirring at room temperature of 1 g composite pellets per 20 ml solution):

| Sample No. | Cation species initial, ppb | Ag 1,000 | Al 10,000 | As 10,000 | Ba 10,000 | Be 10,000 | Bi 10,000 | Ca 10,000 |
|---|---|---|---|---|---|---|---|---|
| 32 | % removal | 69 | 0 | 0 | 0 | 1 | 6 | 2 |
| 14 | after 2 days | 70 | 0 | 0 | 1 | 0 | 0 | 0 |
| 54 | stirring (1 g | 74 | 0 | 0 | 1 | 0 | 0 | 0 |
| 55 | composite: | 71 | 0 | 0 | 0 | 0 | 0 | 0 |
| 56 | 20 ml | 77 | 0 | 0 | 2 | 0 | 10 | 0 |
| 57 | solution) | 77 | 0 | 0 | 0 | 0 | 39 | 0 |

| Sample No. | Cation species initial, ppb | Cd 10,000 | Co 10,000 | Cr 10,000 | Cu 10,000 | Fe 10,000 | Ga 10,000 |
|---|---|---|---|---|---|---|---|
| 32 | % removal | 13 | 0 | 0 | 0 | 0 | 0 |
| 14 | after 2 days | 22 | 0 | 0 | 0 | 0 | 0 |
| 54 | stirring (1 g | 24 | 0 | 0 | 0 | 0 | 0 |
| 55 | composite: | 13 | 0 | 0 | 0 | 0 | 0 |
| 56 | 20 ml | 17 | 0 | 0 | 0 | 0 | 0 |
| 57 | solution) | 41 | 0 | 0 | 55 | 0 | 0 |

-continued

| Sample No. | Cation species initial, ppb | K 10,000 | Li 10,000 | Mg 10,000 | Mn 10,000 | Na 30,000 | Ni 10,000 | Pb 10,000 |
|---|---|---|---|---|---|---|---|---|
| 32 | % removal | 0 | 0 | 0 | 0 | 5 | 0 | 0 |
| 14 | after 2 days | 0 | 0 | 0 | 0 | 1 | 0 | 0 |
| 54 | stirring (1 g | 0 | 0 | 0 | 0 | 0 | 0 | 0 |
| 55 | composite: | 0 | 0 | 0 | 0 | 0 | 0 | 0 |
| 56 | 20 ml | 0 | 0 | 0 | 0 | 0 | 0 | 0 |
| 57 | solution) | 0 | 0 | 0 | 0 | 0 | 0 | 24 |

| Sample No. | Cation species initial, ppb | Rb 10,000 | Se 10,000 | Sr 10,000 | Tl 10,000 | U 10,000 | V 10,000 | Zn 10,000 |
|---|---|---|---|---|---|---|---|---|
| 32 | % removal | 0 | 0 | 0 | 0 | 86 | 0 | 0 |
| 14 | after 2 days | 1 | 0 | 0 | 0 | 0 | 0 | 0 |
| 54 | stirring (1 g | 0 | 0 | 0 | 0 | 0 | 0 | 0 |
| 55 | composite: | 4 | 1 | 0 | 0 | 0 | 0 | 0 |
| 56 | 20 ml | 0 | 43 | 0 | 0 | 0 | 0 | 0 |
| 57 | solution) | 0 | 98 | 0 | 0 | 0 | 0 | 0 |

Screening Method 2. An aqueous mixed metal solution was prepared by diluting a commercially available "Precious Metals, plasma standard solution, Specpure™ containing Au, Ir, Os, Pd, Pt, Re, Rh, Ru @ 100 µg/mL, Thermo Scientific™ (cat #AA14652AE) containing Au, Ir, Os, Pd, Pt, Re, Rh and Ru. A 20 ml aliquot is combined with 1 g of composite resins and allowed to mix for 2 days at room temperature. The mixtures were filtered and analyzed for metal ion content by ICP/OES. The following results were obtained:

| Sample No. | Cation species initial, ppb | Au 5,000 | Ir 10,000 | Os 10,000 | Pd 10,000 | Pt 10,000 | Re 10,000 | Rh 10,000 | Ru 10,000 |
|---|---|---|---|---|---|---|---|---|---|
| 32 | % removal | 88 | 8 | 96 | 86 | 91 | 85 | 1 | 5 |
| 14 | after 2 days | 88 | 91 | 95 | 95 | 86 | 30 | 36 | 32 |
| 54 | stirring (1 g | 88 | 95 | 96 | 95 | 95 | 69 | 81 | 65 |
| 55 | composite: | 88 | 95 | 96 | 95 | 95 | 54 | 87 | 54 |
| 56 | 20 ml | 88 | 81 | 96 | 95 | 95 | 48 | 47 | 35 |
| 57 | solution) | 88 | 34 | 59 | 95 | 95 | 8 | 28 | 50 |

As shown above, sintered composites containing different metal scavengers show selective affinity for various metals. Generally, most composites show significant affinity for metal cations such as silver and cadmium in the first table and all cations in the third table. Some composites have absorption selectivity for specific ions like Cysteine and Thiourea groups for bismuth and copper (first table); lead and selenium (second table). PVPP containing composite had significant affinity for uranium.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed:

1. A process for forming a porous composite article comprising:
    forming a molding powder into a desired shape, the molding powder comprising thermoplastic polymer particles combined with a chemical scavenger;
    heating the shape to a temperature of 140° C. to 360° C. for a period of time sufficient to permit the thermoplastic polymer to soften while producing a porous structure having a porosity of at least about 30% and maintaining the shape under pressure, the chemical scavenger being contained within the porous structure; and
    thereafter cooling and recovering the porous composite article having a porosity of at least about 30%, the porous composite article having a three dimensional, non-planar shape.

2. A process according to claim 1, where the temperature is in the range of from about 150° C. and about 320° C.

3. A process according to claim 1, wherein the molding powder is combined with a liquid to form a slurry and then formed into the desired shape.

4. A process according to claim 3, wherein at least a portion of the liquid is separated from the molding powder through filtration or evaporation prior to forming the molding powder into the desired shape.

5. A process according to claim 3, wherein the slurry is loaded into a mold followed by removal of at least a portion of the liquid through draining or evaporation as the molding powder is formed into the desired shape.

6. A process according to claim 1, wherein the molding powder further comprises a leachable agent and wherein the leachable agent is removed from the resulting porous composite article by contacting the porous composite article with a liquid that dissolves the leachable component in order to increase the porosity of the porous composite article.

7. A process according to claim 6, wherein the leachable agent comprises a water soluble solid component.

8. A process according to claim 6, wherein the leachable agent comprises a water soluble metal salt.

9. A process according to claim 1, wherein the thermoplastic polymer particles comprise high density polyethylene polymer particles having a molecular weight of from about 1 million to about 10 million g/mol.

10. A process according to claim 9, wherein the high density polyethylene polymer particles have a bulk density of less than about 0.34 g/cc prior to sintering.

11. A process according to claim 9, wherein the high density polyethylene polymer particles have an average particle size (D50) of less than about 50 microns.

12. A process according to claim 11, wherein the high density polyethylene polymer particles have a multi-lobal shape.

13. A process according to claim 1, wherein the thermoplastic polymer particles comprise polyphenylene sulfide particles.

14. A process according to claim 1, wherein the porous composite article has an average pore size of greater than about 4.5 nm.

15. A process according to claim 1, wherein the chemical scavenger comprises a polyvinyl lactam.

16. A process according to claim 1, wherein the chemical scavenger comprises a scavenger component immobilized on a solid carrier.

17. A process according to claim 16, wherein the solid carrier comprises silica particles, alumina particles, zeolite particles, clay particles, silicate particles, or mixtures thereof.

18. A process according to claim 16, wherein the scavenger component comprises a polyvinyl pyrrolidone, an aminoalkyl compound, a mercaptoalkyl compound, a thiourea, an alkyl thiourea, an imino diacetate, an aminomethyl phosphonic acid, a benzyl amine, an imidazole, an amine, a thiol, an imidazolylpropyl amino, a mercaptophenyl amino, an aminoethyl amino, a polybenzimidazole, or mixtures thereof.

19. A process according to claim 1, wherein the porous composite article is net shape molded during the process.

20. A process according to claim 1, wherein the porous composite article has a solid cylindrical shape or solid spherical shape.

* * * * *